United States Patent
Sakhnini et al.

(10) Patent No.: US 12,058,683 B2
(45) Date of Patent: Aug. 6, 2024

(54) DIRECT CURRENT LOCATION WITH BANDWIDTH PART (BWP) HOPPING

(71) Applicant: QUALCOMM Incorporated, San Diego, CA (US)

(72) Inventors: Iyab Issam Sakhnini, San Diego, CA (US); Peter Gaal, San Diego, CA (US); Tao Luo, San Diego, CA (US); Prashant Sharma, San Jose, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/480,521

(22) Filed: Sep. 21, 2021

(65) Prior Publication Data
US 2023/0090288 A1    Mar. 23, 2023

(51) Int. Cl.
| | |
|---|---|
| *H04W 72/21* | (2023.01) |
| *H04L 5/00* | (2006.01) |
| *H04W 72/044* | (2023.01) |
| *H04W 72/51* | (2023.01) |

(52) U.S. Cl.
CPC ........... *H04W 72/21* (2023.01); *H04L 5/0012* (2013.01); *H04W 72/044* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 11,533,673 B1* | 12/2022 | Pan | H04W 36/03 |
| 11,601,968 B2* | 3/2023 | Wang | H04L 5/0055 |
| 11,601,997 B1* | 3/2023 | Pan | H04W 76/14 |
| 2019/0313394 A1* | 10/2019 | Kubota | H04W 72/0453 |

(Continued)

FOREIGN PATENT DOCUMENTS

| | | | | |
|---|---|---|---|---|
| EP | 3531566 A1 * | 8/2019 | | H04B 1/7143 |
| WO | WO-2019083277 A1 * | 5/2019 | | H04W 72/04 |

(Continued)

OTHER PUBLICATIONS

International Search Report and Written Opinion—PCT/US2022/076337—ISA/EPO—Dec. 20, 2022.

(Continued)

*Primary Examiner* — Kodzovi Acolatse
(74) *Attorney, Agent, or Firm* — Patterson + Sheridan, LLP

(57) ABSTRACT

Certain aspects of the present disclosure provide techniques for providing direct current locations of bandwidth parts (BWPs) in a BWP hopping pattern. Certain aspects relate to a method for wireless communication by a user equipment (UE). In some examples, the UE may receive, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths. In some examples, the UE may transmit, to the BS, at least one uplink direct current location applicable to the plurality of uplink bandwidth parts. In some examples, the UE may transmit, to the BS, on the uplink according to the frequency hopping pattern.

22 Claims, 9 Drawing Sheets

(56) References Cited

U.S. PATENT DOCUMENTS

| | | | | |
|---|---|---|---|---|
| 2021/0075579 A1* | 3/2021 | Liu | ............... | H04L 5/0055 |
| 2021/0211994 A1* | 7/2021 | Shih | ............... | H04W 76/27 |
| 2021/0328622 A1* | 10/2021 | Bhamri | ............... | H04B 1/7156 |
| 2021/0345208 A1* | 11/2021 | Rugeland | ............... | H04W 36/08 |
| 2021/0410107 A1* | 12/2021 | Park | ............... | H04W 76/27 |
| 2022/0046670 A1* | 2/2022 | Lin | ............... | H04W 72/1268 |
| 2022/0070891 A1* | 3/2022 | Nam | ............... | H04L 5/0094 |
| 2022/0124666 A1* | 4/2022 | Vintola | ............... | H04W 64/003 |
| 2022/0174762 A1* | 6/2022 | Pan | ............... | H04W 76/30 |
| 2022/0210847 A1* | 6/2022 | Pan | ............... | H04W 76/12 |
| 2022/0272650 A1* | 8/2022 | Ko | ............... | H04W 56/0045 |
| 2022/0312416 A1* | 9/2022 | Venkata | ............... | H04W 72/0453 |
| 2023/0224879 A1* | 7/2023 | Xing | ............... | H04W 72/0457 |
| | | | | 370/329 |

FOREIGN PATENT DOCUMENTS

| | | | |
|---|---|---|---|
| WO | WO-2022086409 A1 * | 4/2022 | |
| WO | WO-2022148313 A1 * | 7/2022 | |
| WO | WO-2022155488 A1 * | 7/2022 | |

OTHER PUBLICATIONS

Spreadtrum Communications: "Discussion on Aspects Related to Reduced Maximum UE Bandwidth", 3GPP TSG RAN WG1 #104b-e, R1-2102460, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177168, 9 Pages, paragraphs [02.1], [2.2.1.3].

* cited by examiner

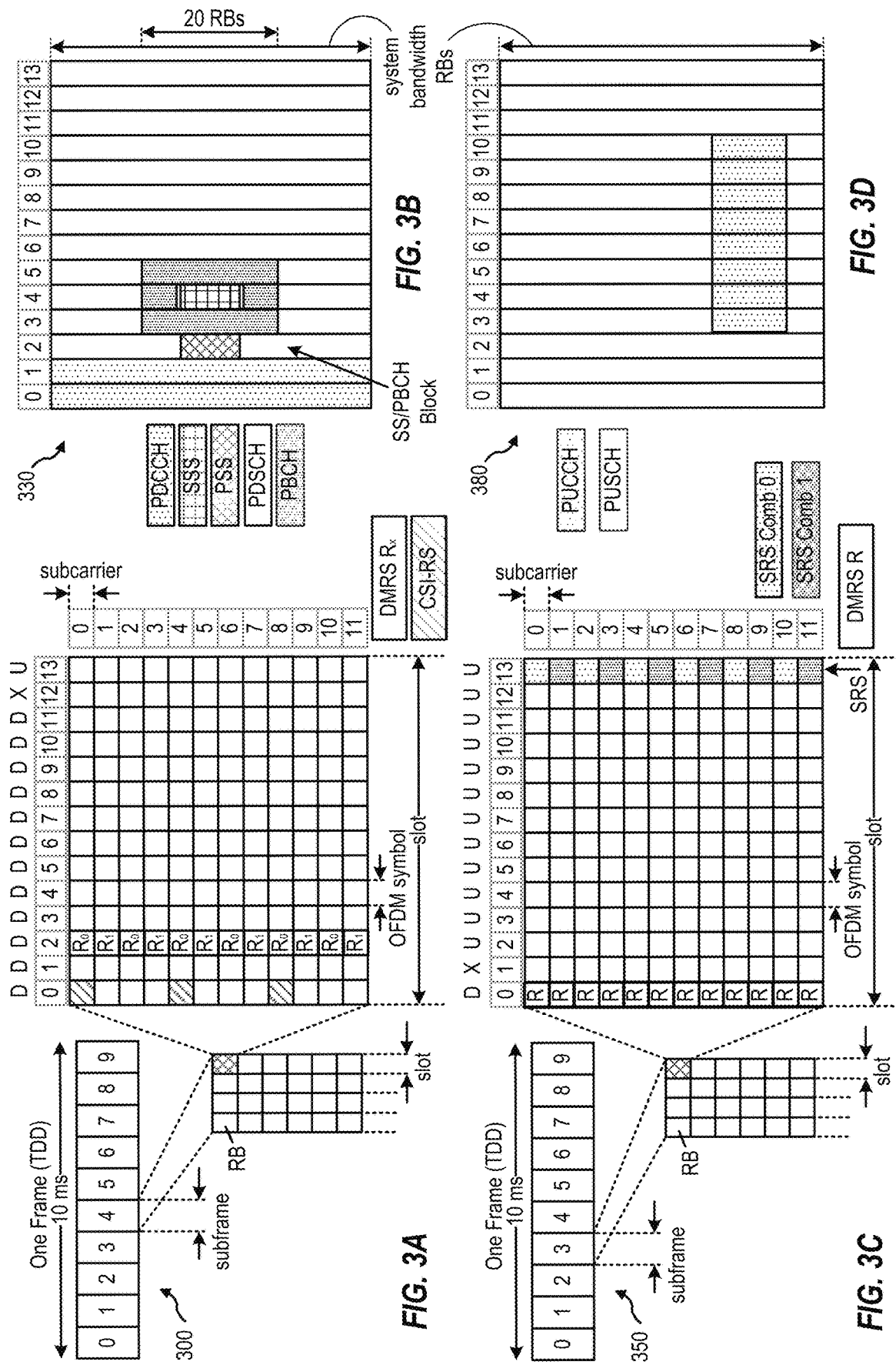

DIRECT CURRENT LOCATION WITH BANDWIDTH PART (BWP) HOPPING

INTRODUCTION

Aspects of the present disclosure relate to wireless communications, and more particularly, to techniques for bandwidth part (BWP) hopping.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a user equipment (UE), comprising a memory; and a processor coupled to the memory. The memory and the processor are configured to: receive, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths; transmit, to the BS, at least one uplink direct current location applicable to the plurality of uplink bandwidth parts; and transmit, to the BS, on the uplink according to the frequency hopping pattern.

One aspect provides a method for wireless communication by a user equipment (UE). The method includes receiving, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths; transmitting, to the BS, at least one uplink direct current location applicable to the plurality of uplink bandwidth parts; and transmitting, to the BS, on the uplink according to the frequency hopping pattern.

One aspect provides a user equipment (UE). The UE includes means for receiving, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths; means for transmitting, to the BS, at least one uplink direct current location applicable to the plurality of uplink bandwidth parts; and means for transmitting, to the BS, on the uplink according to the frequency hopping pattern.

One aspect provides a non-transitory computer readable medium comprising instructions, that when executed by a user equipment, cause the user equipment to perform operations including receiving, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths; transmitting, to the BS, at least one uplink direct current location applicable to the plurality of uplink bandwidth parts; and transmitting, to the BS, on the uplink according to the frequency hopping pattern.

One aspect provides a base station (BS), comprising a memory; and a processor coupled to the memory. The memory and the processor are configured to: transmit, to a user equipment (UE), a request for uplink direct current location information of the UE, wherein the BS is configured to receive on the uplink from the UE according to a frequency hopping pattern for hopping between a plurality of uplink bandwidth parts corresponding to different frequency bandwidths; receive, from the UE, at least one uplink direct current location applicable to the plurality of uplink bandwidth parts; and receive, from the UE, on the uplink according to the frequency hopping pattern.

One aspect provides a method of wireless communication by a base station (BS). The method includes transmitting, to a user equipment (UE), a request for uplink direct current location information of the UE, wherein the BS is configured to receive on the uplink from the UE according to a frequency hopping pattern for hopping between a plurality of uplink bandwidth parts corresponding to different frequency bandwidths; receiving, from the UE, at least one uplink direct current location applicable to the plurality of uplink bandwidth parts; and receiving, from the UE, on the uplink according to the frequency hopping pattern.

One aspect provides a base station (BS) including means for transmitting, to a user equipment (UE), a request for uplink direct current location information of the UE, wherein the BS is configured to receive on the uplink from the UE according to a frequency hopping pattern for hopping between a plurality of uplink bandwidth parts corresponding to different frequency bandwidths; means for receiving, from the UE, at least one uplink direct current location applicable to the plurality of uplink bandwidth parts; and means for receiving, from the UE, on the uplink according to the frequency hopping pattern.

One aspect provides a non-transitory computer readable medium comprising instructions, that when executed by a base station, cause the base station to perform operations including transmitting, to a user equipment (UE), a request for uplink direct current location information of the UE, wherein the BS is configured to receive on the uplink from the UE according to a frequency hopping pattern for hopping between a plurality of uplink bandwidth parts corresponding to different frequency bandwidths; receiving, from the UE, at least one uplink direct current location applicable to the plurality of uplink bandwidth parts; and receiving, from the UE, on the uplink according to the frequency hopping pattern.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures illustrate certain features of the various aspects described herein and are not to be considered limiting of the scope of this disclosure.

FIGS. 3A-3D are schematic diagrams illustrating various example aspects of data structures for a wireless communication network.

DETAILED DESCRIPTION

Aspects of the present disclosure provide apparatuses, methods, processing systems, and computer-readable mediums for providing direct current locations of bandwidth parts (BWPs) in a BWP hopping pattern.

In an uplink communication from a user equipment (UE) to a base station (BS), a UE may transmit uplink signaling using a range of frequency-domain resources. For example, the UE may be configured with a maximum bandwidth over which it can transmit uplink signaling. However, the UE may consume a relatively large amount of power if the UE were to use the entire maximum bandwidth for uplink transmissions. Thus, in order to reduce the amount of power consumed, the UE may be configured to transmit uplink communications using smaller portions of the maximum bandwidth. For example, the UE may transmit via narrow bandwidth parts (BWPs) that occupy fewer frequency-domain resources than a transmission over the entire maximum bandwidth.

In some examples, the UE may be configured to communicate uplink transmissions over "hopping" BWPs according to a BWP hopping pattern. That is, the UE may transmit over multiple different BWPs over multiple different time periods by hopping between use of different portions of frequency-domain resources within the maximum bandwidth for uplink transmission. For example, the frequency location of a BWP used for uplink transmission during each time period or "hop" may be determined based on a frequency hopping sequence or a fixed frequency offset from the reference frequency location.

Each of the BWPs of a hopping pattern may include a direct current. In some examples, the direct current is a frequency-domain location (e.g., a subcarrier) within each of the BWPs that is reserved and may not be used to carry any data. In some cases, the direct current may be used by the UE or a BS to center on a carrier frequency over which a BWP is transmitted.

Certain aspects described herein provide techniques for transmitting a direct current location of one or more BWPs used for uplink transmission. For example, given that a particular BWP hopping pattern may include hopping BWPs, a BS may not know the direct current location for each of the BWPs in a particular pattern. If the BS is not aware of the direct current location, the BS may end up transmitting data over the direct current and causing misalignment of communication resources.

Introduction to Wireless Communication Networks

Figure 1:
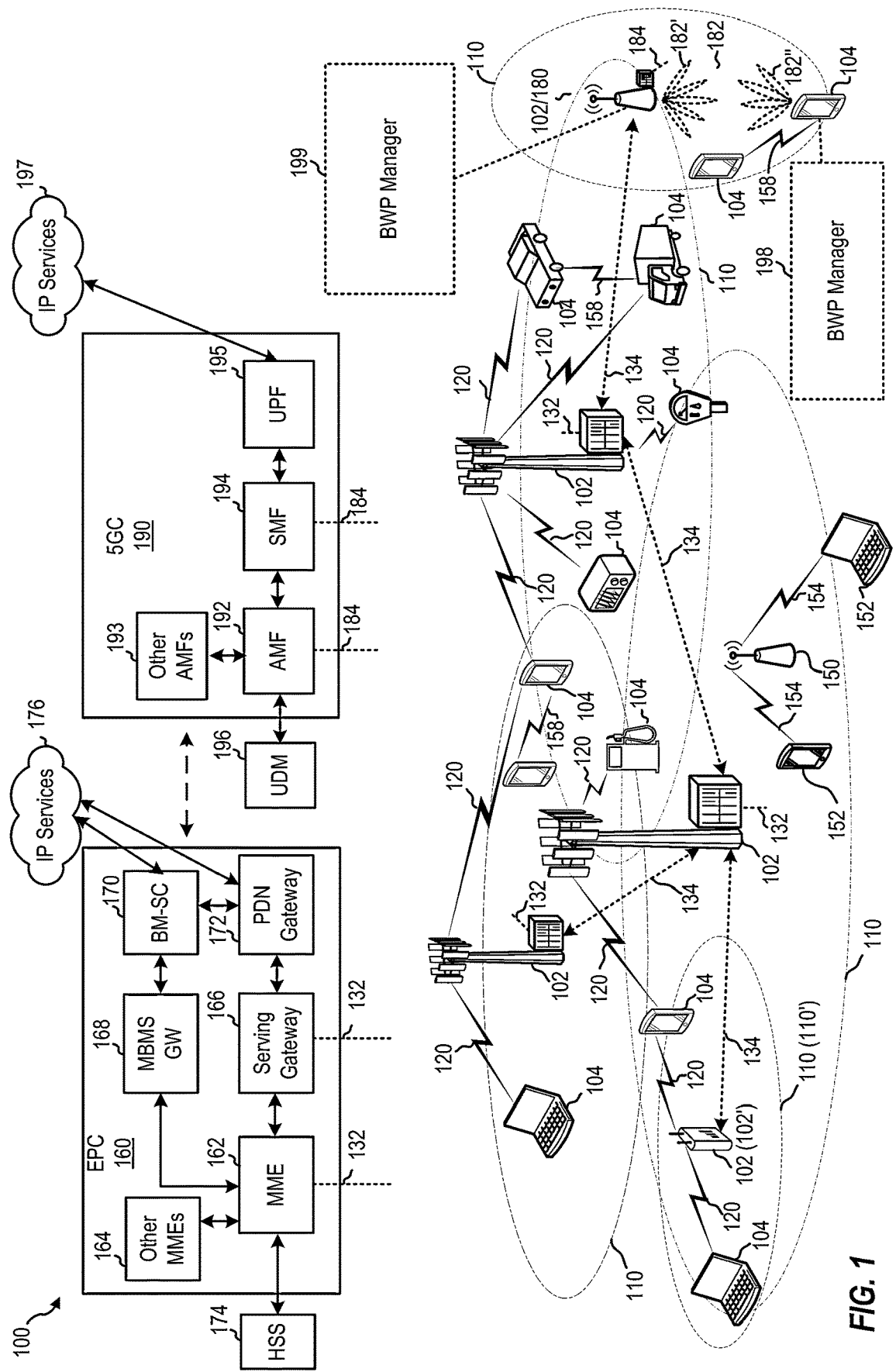
FIG. 1 is a block diagram conceptually illustrating an example wireless communication network.

FIG. 1 is a block diagram conceptually illustrating an example wireless communication network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes BWP Manager 199, which may be configured to request a direct current location for one or more BWPs. Wireless network 100 further includes BWP Manager 198, which may be used configured to provide the BS with a direct current location for one or more BWPs.

Figure 2:
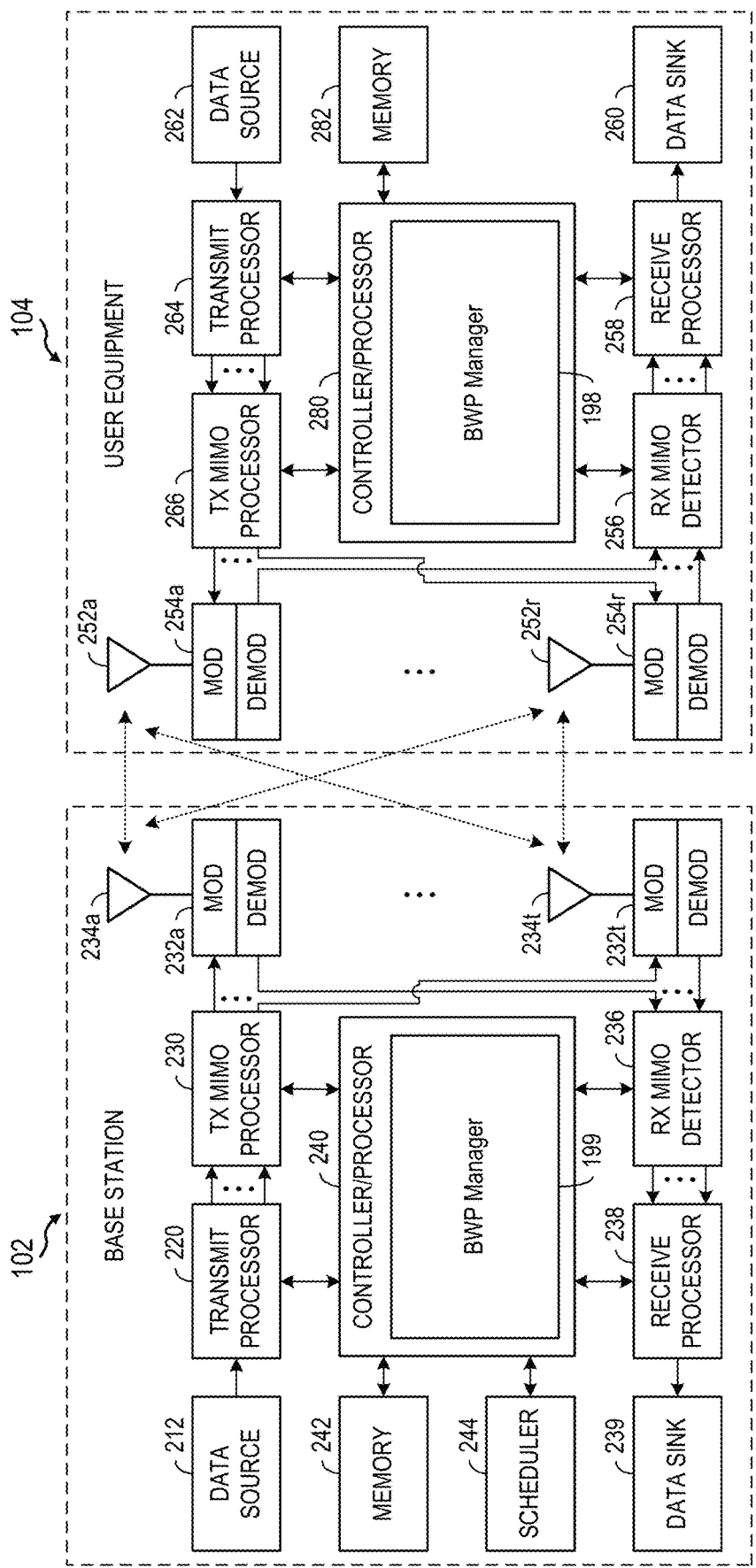
FIG. 2 is a block diagram conceptually illustrating aspects of an example of a base station (BS) and user equipment (UE).

FIG. 2 is a block diagram conceptually illustrating aspects of an example of a base station (BS) 102 and user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the illustrated example, controller/processor 240 includes the BWP manager 199 of FIG. 1. Notably, while illustrated as an aspect of controller/processor 240, the BWP manager 199 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the illustrated example, controller/processor 280 includes the BWP manager 198 of FIG. 1. Notably, while illustrated as an aspect of controller/processor 280, the BWP manager 198 may be implemented additionally or alternatively in various other aspects of user equipment 104 in other implementations.

FIGS. 3A-3D are schematic diagrams illustrating various example aspects of data structures for a wireless communication network (e.g., wireless communication network 100 of FIG. 1). In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Techniques for Frequency Hopping

Figure 4A:
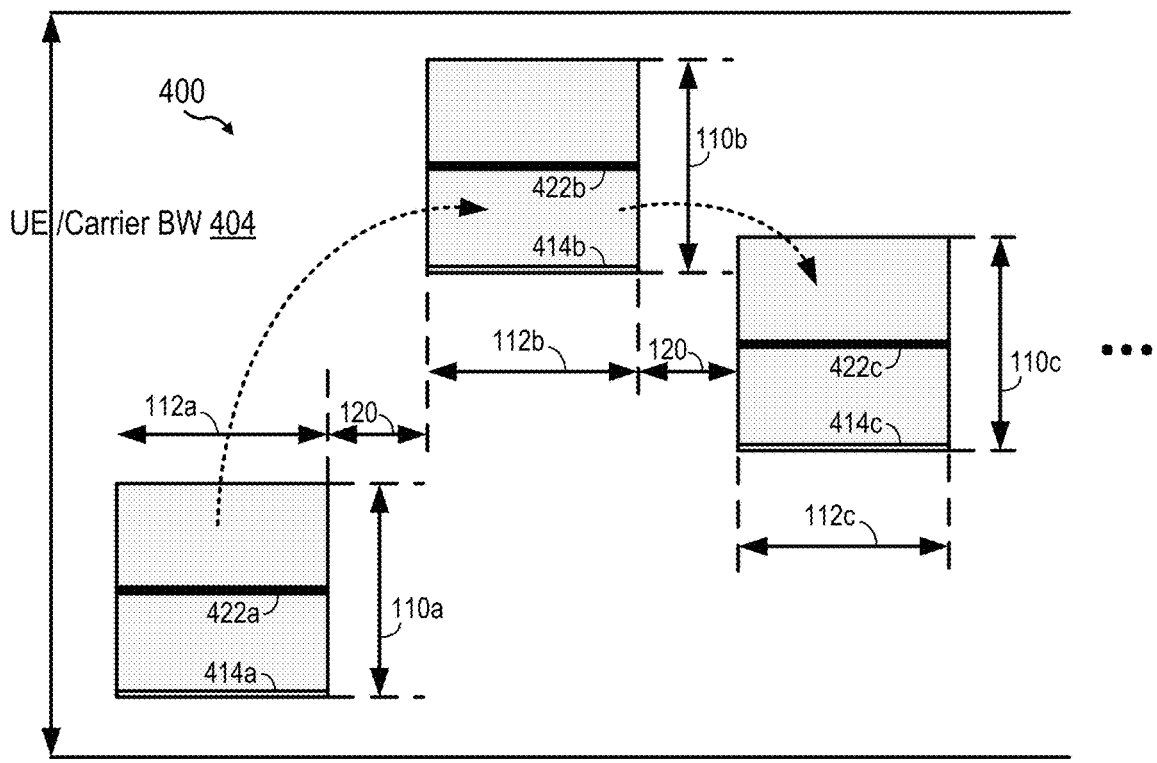
FIGS. 4A and 4B are block diagrams illustrating example frequency bandwidth part (BWP) patterns.

FIG. 4A is a block diagram illustrating an example bandwidth part (BWP) frequency hopping pattern (e.g., first BWP hopping pattern 400), in accordance with aspects of the present disclosure. As illustrated, each of a first BWP 410a, a second BWP 410b, and a third BWP 410c (collectively referred to as the first set of BWPs 410) includes a unique set of frequency-domain communication resources inside a channel bandwidth (e.g., a maximum bandwidth 404 of a given carrier). Each BWP of the first set of BWPs 410 may have a corresponding BWP index (e.g., BWP index) or any other suitable BWP identifier (e.g., BWP-Id) configured to uniquely identify a particular BWP. For example, the first BWP 410a may be associated with a first BWP index value (e.g., 1), the second BWP 410b may be associated with a second BWP index value (e.g., 3), and the third BWP 410c may be associated with a third BWP index value (e.g., 2).

In some examples, a maximum carrier bandwidth may be up to 100 MHz in frequency range 1 (FR1) (e.g., 410 MHz to 7.125 GHz), or up to 400 MHz in frequency range 2 (FR2) (e.g., 24.25 GHz to 52.6 GHz). It should be noted that other suitable frequency ranges are also within the scope of the instant disclosure. In some cases, the carrier bandwidth may be wider than a maximum bandwidth over which a UE is capable of communicating. Thus, in some cases, the maximum bandwidth 404 illustrated in FIG. 4 may refer to a maximum UE bandwidth over which a UE is capable of communicating.

In some examples, communication resources over which a UE (e.g., UE 104 of FIGS. 1 and 2) is configured to transmit and receive signaling are defined by the first BWP hopping pattern 400. Here, each BWP of the first set of BWPs 410 corresponds to a different frequency bandwidth within the maximum bandwidth 404 relative to another of the first set of BWPs. Each BWP of the first set of BWPs 410 are defined by a frequency bandwidth that is less than or equal to a maximum bandwidth 404 of the UE 104 or carrier. Each BWP of the first set of BWPs 410 may be used for uplink communication during different time periods 412 according to the first BWP hopping pattern 400. For example, time periods 412 may be recurring (e.g., periodically), and the first BWP hopping pattern 400 may indicate to hop between use of different BWPs between time periods 412. In certain aspects, the first BWP hopping pattern 400 indicates to hop between BWPs of the first set of BWPs 410 in a particular sequence or order, such as in a round-robin fashion. In the example shown, the first BWP hopping pattern 400 indicates to hop according to the sequence {1, 3, 2}, meaning first BWP 410a (e.g., index 1), second BWP 410b (e.g., index 3), and third BWP 410c (e.g., index 2). Thus, in a first time period 412a, the uplink communication is performed in first BWP 410a, in a second time period 412b, uplink communication is performed in second BWP 410b, and in a third time period 412c, uplink communication is performed in third BWP 410c.

In some examples, consecutive time periods 412 may be separated in time by a gap 420 according to the first BWP hopping pattern 400. For example, a symbol or slot-wise gap 420 may be configured between the first time period 412a and the second time period 412b, and between the second time period 412b and the third time period 412c. While the gap 420 between the first time period 412a and the second time period 412b is illustrated as being the same duration as the gap 420 between the second time period 412b and the third time period 412c, one or more gaps 420 of a particular hopping pattern may have a different duration than another gap of the same hopping pattern. Each gap 420 may be configured to allow time for radio frequency (RF) front-end circuitry of the UE 104 to be reconfigured for a new frequency location of a next BWP to be used for a next time period 412 according to the first BWP hopping pattern 400.

Each BWP of the first set of BWPs 410 may be defined with respect to a reference point 414 (e.g., a reference frequency location). For example, each BWP may be defined as having a starting frequency with respect to the reference point 414 and having a bandwidth. In certain aspects, the starting frequency is the same frequency as the reference point 414, or at an offset frequency from the reference point 414. The reference point 414 may be defined in terms of a physical resource block (PRB) with a lowest index in the BWP, a tone (e.g., subcarrier) number in the frequency-domain, and/or any other suitable indication.

As illustrated in FIG. 4A, as an example, a first reference point 414a of the first BWP 410a is in the same frequency location (e.g., subcarrier) as the starting frequency of the first BWP 410a (e.g., at the starting frequency of the first BWP 410a). Similarly, a second reference point 414b of the second BWP 410b is in the same frequency location as the starting frequency of the second BWP 410b, and a third reference point 414c of the third BWP 410c is in the same frequency location as the starting frequency of the third BWP 410c. In particular, each of the first set of BWPs 410 have the same bandwidth, meaning they span the same number of frequency resources. The beginning frequency resource or index from which each BWP spans, however, is different. Accordingly, the reference point 414 of each BWP may be at the same relative frequency location with respect to the overall bandwidth of each BWP, meaning it is at the same offset in frequency from the corresponding starting frequency of the respective BWP.

The reference point 414 of each of the first set of BWPs 410 may provide an implicit indication of a location of a direct current (e.g., a first direct current 422a, a second direct current 422b, and/or a third direct current 422c of FIG. 4A) within a corresponding BWP. For example, a first reference point 414a of the first BWP 410a may provide the BS 102 with a location of the first direct current 422a within the first BWP 410a. A direct current 422 may be defined by frequency-domain resources within each of the first set of BWPs 410. In some examples, the direct current 422 may be a subcarrier. As illustrated in FIG. 4A, the offset in frequency of the frequency location of the first direct current 422a within the first BWP 410a with respect to the first reference point 414a is the same as the offset of the frequency location of the second direct current 422b within the second BWP 410b with respect to the second reference point 414b, and the same as the offset of the frequency location of the third direct current 422c within the third BWP 410c with respect to the third reference point 414c. As illustrated in FIG. 4A, the first direct current 422a of the first BWP 410a is in the same relative frequency location within the first BWP 410a (e.g., with respect to the starting frequency of the first BWP 410a) as the relative frequency location of second direct current 422b within second BWP 410b and the relative frequency location of third direct current 422c within third BWP 410c. Thus, although each BWP of the first set of BWPs 410 occupy different frequency ranges within the maximum bandwidth 404, the location of the reference points 414 and direct currents 422 are all in the same relative frequency location within the corresponding BWP of the first set of BWPs 410.

Figure 4B:
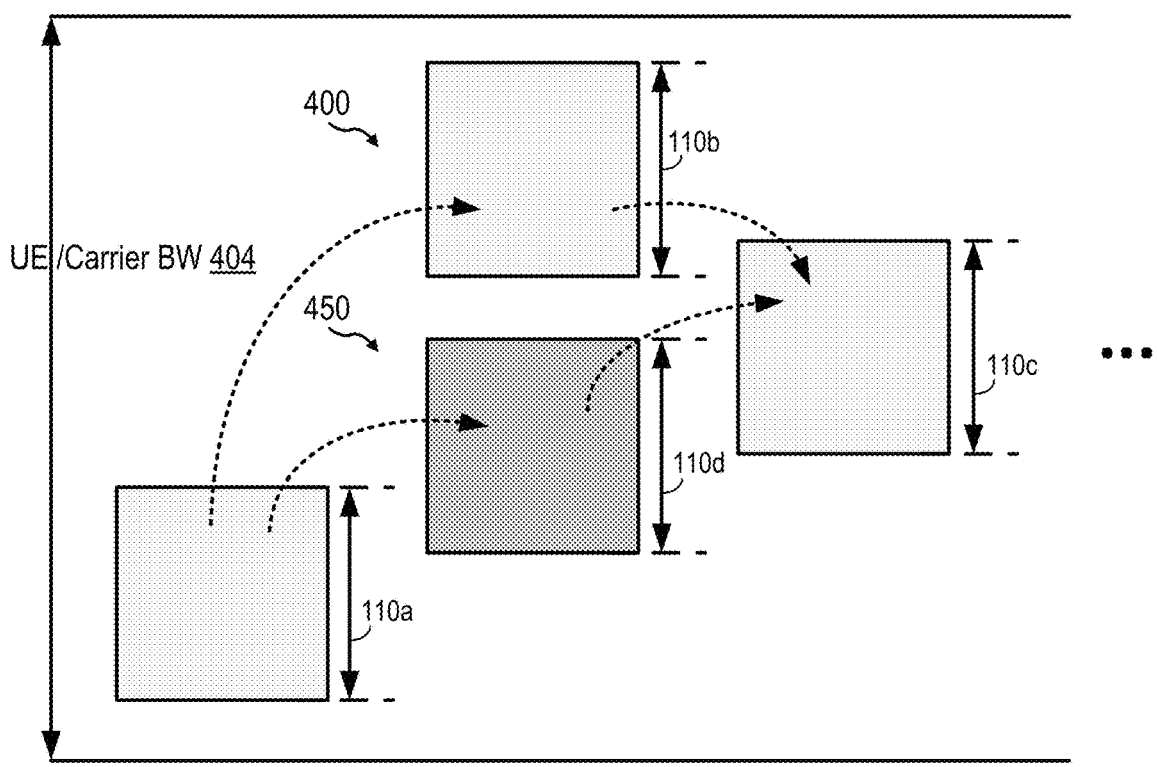

FIG. 4B is a block diagram illustrating an example of a second BWP hopping pattern 450 relative to the first BWP hopping pattern 400. As illustrated, the second BWP hopping pattern 450 includes the first BWP 410a and the third BWP 410c of the first BWP hopping pattern, and a fourth BWP 410d. The second BWP hopping pattern 450 indicates to use the following sequence of BWPs for uplink communication: first BWP 410a, fourth BWP 410d, and third BWP 410c. Accordingly, certain BWPs, including first BWP 410a and second BWP 410b are used in both first BWP hopping pattern 400 and the second BWP hopping pattern 450, and are identified by the same index value in each of the first BWP hopping pattern 400 and the second BWP hopping pattern 450.

Although FIGS. 4A and 4B illustrate use of a sequence of three BWPs in each of the first BWP hopping pattern 400 and the second BWP hopping pattern 450, the length of the sequence used in each pattern is an example, and the length may be greater than or less than three. Further, though each of the BWP hopping patterns is shown using a different BWP for each portion of the sequence, a BWP may be repeated more than one time in the sequence of the BWP hopping pattern. For example, a BWP hopping pattern having a sequence of four BWPs could be defined by the first BWP 410a, the second BWP 410b, the fourth BWP 410d, and the second BWP 410b.

In certain aspects, the BWPs of the first BWP hopping pattern 400 and/or the second BWP hopping pattern 450 may be virtual BWPs. For example, a virtual BWP may have the same subcarrier spacing as an actual BWP, but have a larger bandwidth. The full bandwidth of a virtual BWP may not be used as the bandwidth for an actual BWP, but instead, the larger bandwidth of the virtual BWP may be used as an expanded boundary that contains the frequency resources used by multiple actual BWPs. Thus, the actual frequency location within the virtual BWP bandwidth may varying according to the actual BWP used.

Figure 5:
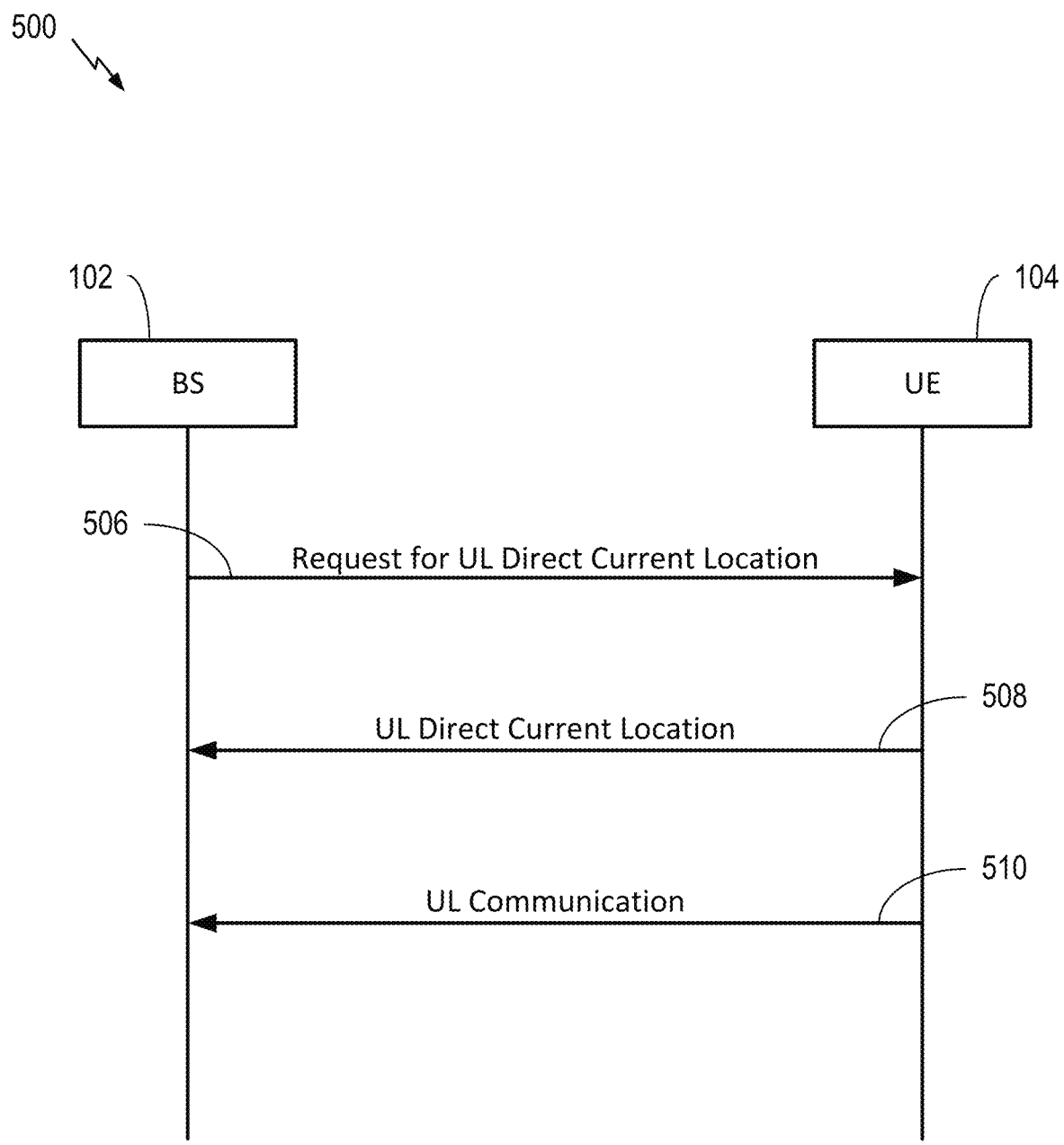
FIG. 5 is a call-flow diagram illustrating example communications between a BS and a UE.

FIG. 5 is a call-flow diagram illustrating example communications 500 between a base station (BS) (e.g., BS 102 of FIGS. 1 and 2) and user equipment (UE) (e.g., UE 104 of FIGS. 1 and 2). In the illustrated example, the UE 104 is configured to transmit uplink signaling to the BS 102 according to a BWP hopping pattern for hopping between a plurality of bandwidth parts corresponding to different frequency bands. For example, as illustrated in FIGS. 4A and 4B, the UE 104 may transmit uplink signaling via BWPs of the first BWP hopping pattern 400 and/or the second BWP hopping pattern 450 within the maximum bandwidth 404.

In a first communication 506, the BS 102 may transmit, to the UE 104, a request for uplink direct current location information of the UE 104. In one example, the UE 104 may receive the first communication 506, which may be a downlink transmission (e.g., a radio resource control (RRC) message) that includes an information element (IE) (e.g., report UplinkTxDirectCurrent) requesting that the UE 104 provide the BS 102 with the uplink transmit direct current location.

In a second communication 508, the UE 104 may transmit an uplink transmission in response to the request of the first communication 506, wherein the second communication 508 includes an indication of an uplink direct current location applicable to one or more BWPs of a BWP hopping pattern (e.g., one or more BWPs of the first BWP hopping pattern 400 and/or the second BWP hopping pattern 450) that the UE 104 uses for uplink transmissions to the BS 102. In one example, the indication of the uplink direct current location may be included in an IE (e.g., uplinkTxDirectCurrentList) of the second communication 508. In certain aspects, the second communication 508 is an RRC message, such as a RRC Reconfiguration Complete message or a RRC Resume Complete message. In certain aspects, the indication of the uplink direct current location includes an indication of a reference point (e.g., reference point 414 of FIG. 4A) of one or more BWPs, wherein the indication of the reference point is configured to implicitly provide the BS 102 with a location of the actual uplink direct current location of one or more BWPs.

The UE 104 may be configured (e.g., by the BS 102 during a random access channel (RACH) procedure, or by a network or device manufacturer prior to RACH) with the BWP hopping pattern that uses a plurality of BWPs. In some examples, the UE 104 may transmit a single indication of an uplink direct current location in the second communication 508, wherein the single indication may implicitly indicate an actual uplink direct current location of each of the plurality of BWPs of the first BWP hopping pattern. In some examples, the single indication may implicitly indicate the actual uplink direct current location of each of the plurality of BWPs based on one or more of the BWP hopping pattern (which is known by the BS 102) and the single indication.

In some examples, the single indication may be a single reference point of one BWP (e.g., a reference BWP) of the plurality of BWPs of the BWP hopping pattern. The reference BWP may be any one of the BWPs of the BWP hopping pattern. In one example, the single reference point of the one BWP may be mapped to an actual uplink direct current location of the one BWP according to a mapping (e.g., offset) known by the BS 102 and the UE 104. If the actual uplink direct current location of the one BWP is in the same relative frequency location within the one BWP as the actual uplink direct current locations is within the remaining BWPs of the plurality of BWPs, then the single indication may provide the BS 102 with adequate information to determine the actual uplink direct current locations for each of the plurality of BWPs of the BWP hopping pattern. For example, the BS 102 may first determine the actual uplink direct current location of the one BWP based on the mapping. Then, because the relative frequency location of the actual uplink direct current location of the remaining BWPs within each BWP is the same as the relative frequency location of the actual uplink direct current location of the one BWP within the one BWP, the BS 102 may determine the actual uplink direct current location of all the BWPs of the BWP hopping pattern.

In certain aspects, the single indication of the uplink direct current location may include an explicit identification of one uplink direct current location (e.g., direct current 422 of FIG. 4A) of a particular one BWP of a plurality of BWPs (e.g., of a BWP hopping pattern). In this example, although the single indication may explicitly identify an actual uplink direct current location of one BWP, the single indication may also implicitly indicate the actual uplink direct current location of the remaining plurality of BWPs. In such an example, the relative frequency location of the actual uplink direct current of each of the plurality of BWPs may be the same relative frequency location as that of the actual uplink direct current location of the one BWP. As such, the single indication may provide the BS 102 with adequate information to determine the actual uplink direct current locations for each of the plurality of BWPs. In other words, the single indication of the actual uplink direct current location for one BWP in the plurality of BWPs may be a relative uplink direct current location for each of the other BWPs in the plurality of BWPs.

In certain aspects, the single indication of the uplink direct current location includes an explicit or implicit indication of an uplink direct current location (e.g., direct current 422 of FIG. 4A) of one BWP of a plurality of BWPs used in multiple BWP hopping patterns. For example, if the uplink direct current location is in the same relative frequency location for each BWP of the plurality of BWPs, then the single indication from the UE 104 may be sufficient to inform the BS 102 of the uplink direct current locations of the BWPs of each BWP hopping pattern. In this example, if the single indication is an implicit indication, the single indication may be a reference point (e.g., reference point 414 of FIG. 4A) that is common among the BWPs of each of the multiple BWP hopping patterns. It should be noted that because the multiple BWP hopping patterns are known by the BS 102, the single indication may also implicitly inform the BS that the uplink direct current location is in the same relative frequency location for each BWP in each of the multiple BWP hopping patterns.

In some cases, the uplink direct current location of each BWP hopping pattern may vary across patterns. That is, the UE 104 may be configured with multiple BWP hopping patterns, and one or more of the multiple patterns may have a relative uplink direct current location within its BWPs that is different from another of the BWP hopping patterns. In such an example, the relative frequency location of an uplink direct current location of BWPs in one BWP hopping pattern is different from the relative frequency location of an uplink direct current location of BWPs in another BWP hopping pattern. Thus, the UE 104 may transmit a different single indication of an uplink direct current location for each BWP hopping pattern.

In certain aspects, in response to the first communication 506, the UE 104 may transmit a set or a list of uplink direct current locations for each BWP in a BWP hopping pattern. For example, if the relative uplink direct current location of one or more BWPs of a BWP hopping pattern are different from a relative uplink direct current location of another BWP in the same BWP hopping pattern, the UE 104 may transmit, in the second communication 508, an indication of an uplink direct current location for each of the BWPs in the pattern.

In some examples, the UE 104 is configured with multiple BWP hopping patterns, including a first BWP hopping pattern (e.g., the first BWP hopping pattern 400 of FIGS. 4A and 4B) and a second BWP hopping pattern (e.g., the second BWP hopping pattern 450 of FIG. 4B). The first BWP hopping pattern may include a BWP having a relative frequency location of an uplink direct current that is different from a relative frequency location of another direct current of another BWP in the second BWP hopping pattern. That is, one or more relative uplink direct current locations in the first BWP hopping pattern may be different than a relative frequency location of another uplink direct current location in the second BWP hopping pattern. In such an example, the UE 104 may transmit, in the second communication 508, an indication (e.g., explicit or implicit) of an uplink direct current location for each of the BWPs in the first BWP hopping pattern and the second BWP hopping pattern.

It should be noted that in some examples, signaling containing an uplink direct current location for each BWP in multiple BWP hopping patterns may include several (e.g., more than four) uplink direct current locations. Thus, in some examples, the second communication 508 may include a single message with an indication of each of the more than four uplink direct current locations.

However, in some cases, the list may be reduced if one or more BWPs in both of the first BWP hopping pattern and the second BWP hopping pattern are the same. In such a case, the UE 104 may reduce the number of uplink direct current locations transmitted to the BS 102 in the second communication 508 by transmitting uplink direct current locations for a union of BWPs used across the multiple BWP hopping patterns. For example, if two BWP hopping patterns each include one or more BWPs that are the same in each pattern, then the UE 104 may only provide one indication of the uplink direct current location for the BWPs that are the same. For example, referring to FIGS. 4A and 4B, two different BWP hopping patterns are illustrated: a first BWP hopping pattern 400 and a second BWP hopping pattern 450. In this example, the first BWP 410a and the third BWP 410c are used in both first BWP hopping pattern 400 and second BWP hopping pattern 450. Further, second BWP 410b and fourth BWP 410d are used in first BWP hopping pattern 400 and second BWP hopping pattern 450, respectively. Accordingly, the list may include only one instance of each of first BWP 410a and second BWP 410b instead of two instances for first BWP hopping pattern 400 and second BWP hopping pattern 450. For example, the list may include one uplink direct location for each of the BWPs 410a-d.

In a third communication 510, the UE may transmit, and the BS may receive, on the uplink according to a frequency hopping pattern of the first BWP hopping pattern 400 and/or the second BWP hopping pattern 450.

Figure 6:
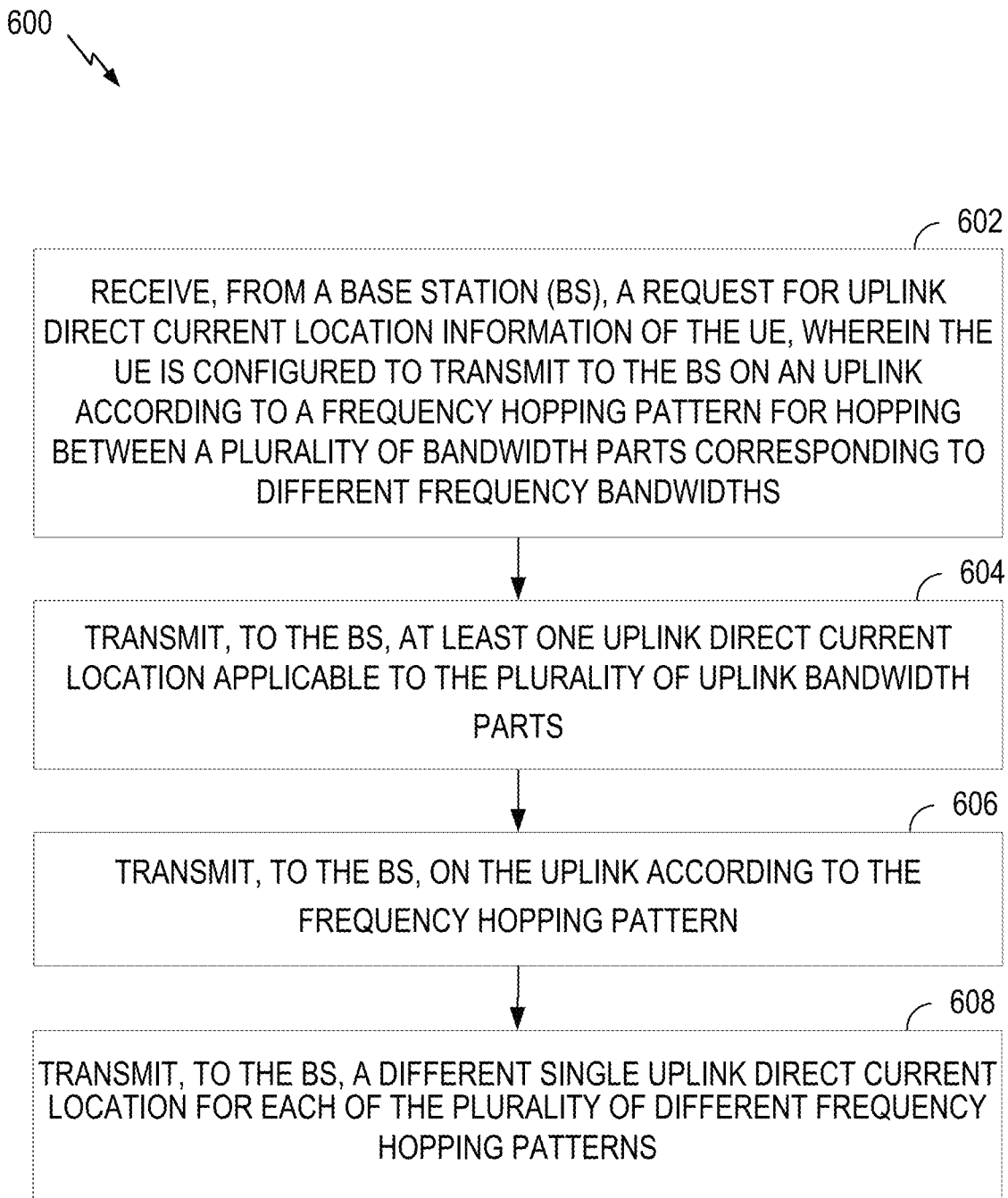
FIG. 6 is a flow diagram illustrating example operations of a UE.

FIG. 6 is a flow diagram illustrating example operations 600 for wireless communication, in accordance with certain aspects of the present disclosure. The operations 600 may be performed, for example, by a UE (e.g., such as the UE 104 in the wireless communication network 100 of FIG. 1). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at a first block 602, by receiving, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths.

The operations 600 may proceed, at a second block 604, by transmitting, to the BS, at least one uplink direct current location applicable to the plurality of uplink bandwidth parts.

The operations 600 may proceed, at a third block 606, by transmitting, to the BS, on the uplink according to the frequency hopping pattern.

In some examples, the operations 600 may include a fourth block 608 for transmitting, to the BS, a different single uplink direct current location for each of the plurality of different frequency hopping patterns, wherein the UE is configured with a plurality of different frequency hopping patterns.

In certain aspects, the at least one uplink direct current location comprises a single uplink direct current location applicable to the plurality of uplink bandwidth parts.

In certain aspects, the single uplink direct current location is an actual uplink direct current location of one of the plurality of uplink bandwidth parts, and wherein the single uplink direct current location is a relative direct current location for each of the plurality of uplink bandwidth parts other than the one of the plurality of uplink bandwidth parts.

In certain aspects, the frequency hopping pattern comprises a sequence of bandwidth parts, and wherein the one of the plurality of uplink bandwidth parts comprises a first bandwidth part in time of the sequence of bandwidth parts.

In certain aspects, wherein the single uplink direct current location is a relative direct current location for each of the plurality of uplink bandwidth parts.

In certain aspects, the UE is configured with a plurality of different frequency hopping patterns, and wherein the single uplink direct current location is applicable to each of the plurality of different frequency hopping patterns.

In certain aspects, the at least one uplink direct current location comprises a set of uplink direct current locations including a plurality of uplink direct current locations applicable to at least the plurality of uplink bandwidth parts.

In certain aspects, the UE is configured with a plurality of different frequency hopping patterns, and the at least one uplink direct current location comprises a plurality of sets of uplink direct current locations each applicable to a different one of the plurality of different frequency hopping patterns.

In certain aspects, the UE is configured with a plurality of different frequency hopping patterns, and wherein the plurality of uplink direct current locations comprise a union of actual uplink direct current locations of bandwidth parts used in the plurality of different frequency hopping patterns.

Figure 7:
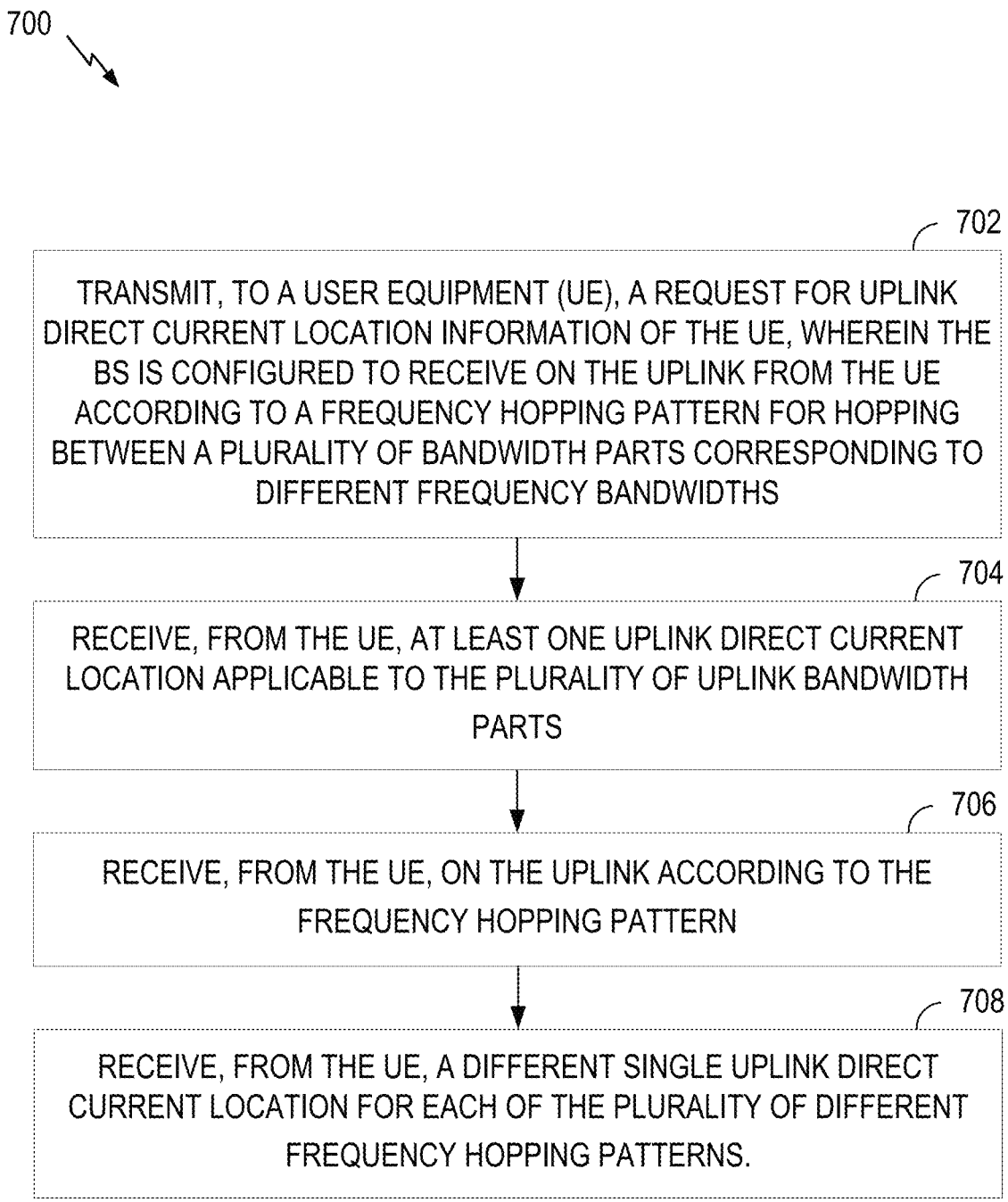
FIG. 7 is a flow diagram illustrating example operations of a BS.

FIG. 7 is a flow diagram illustrating example operations 700 for wireless communication, in accordance with certain aspects of the present disclosure. The operations 700 may be performed, for example, by a BS (e.g., such as the BS 102 in the wireless communication network 100 of FIG. 1). The operations 700 may be complementary to the operations 600 performed by the UE. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at a first block 702, by transmitting, to a user equipment (UE), a request for uplink direct current location information of the UE, wherein the BS is configured to receive on the uplink from the UE according to a frequency hopping pattern for hopping between a plurality of uplink bandwidth parts corresponding to different frequency bandwidths.

The operations 700 may proceed, at a second block 704, by receiving, from the UE, at least one uplink direct current location applicable to the plurality of uplink bandwidth parts.

The operations 700 may proceed, at a third block 706, by receiving, from the UE, on the uplink according to the frequency hopping pattern.

In some examples, the operations 700 may include a fourth block 708 for receiving, from the UE, a different single uplink direct current location for each of the plurality of different frequency hopping patterns.

In certain aspects, the at least one uplink direct current location comprises a single uplink direct current location applicable to the plurality of uplink bandwidth parts.

In certain aspects, the single uplink direct current location is an actual uplink direct current location of one of the plurality of uplink bandwidth parts, and wherein the single uplink direct current location is a relative direct current location for each of the plurality of uplink bandwidth parts other than the one of the plurality of uplink bandwidth parts.

In certain aspects, the frequency hopping pattern comprises a sequence of bandwidth parts, and wherein the one of the plurality of uplink bandwidth parts comprises a first bandwidth part in time of the sequence of bandwidth parts.

In certain aspects, the single uplink direct current location is a relative direct current location for each of the plurality of uplink bandwidth parts.

In certain aspects, the single uplink direct current location is applicable to each of the plurality of different frequency hopping patterns.

In certain aspects, the at least one uplink direct current location comprises a set of uplink direct current locations including a plurality of uplink direct current locations applicable to at least the plurality of uplink bandwidth parts.

In certain aspects, the at least one uplink direct current location comprises a plurality of sets of uplink direct current locations each applicable to a different one of the plurality of different frequency hopping patterns.

In certain aspects, the plurality of uplink direct current locations comprise a union of actual uplink direct current locations of bandwidth parts used in the plurality of different frequency hopping patterns.

Example Wireless Communication Devices

Figure 8:
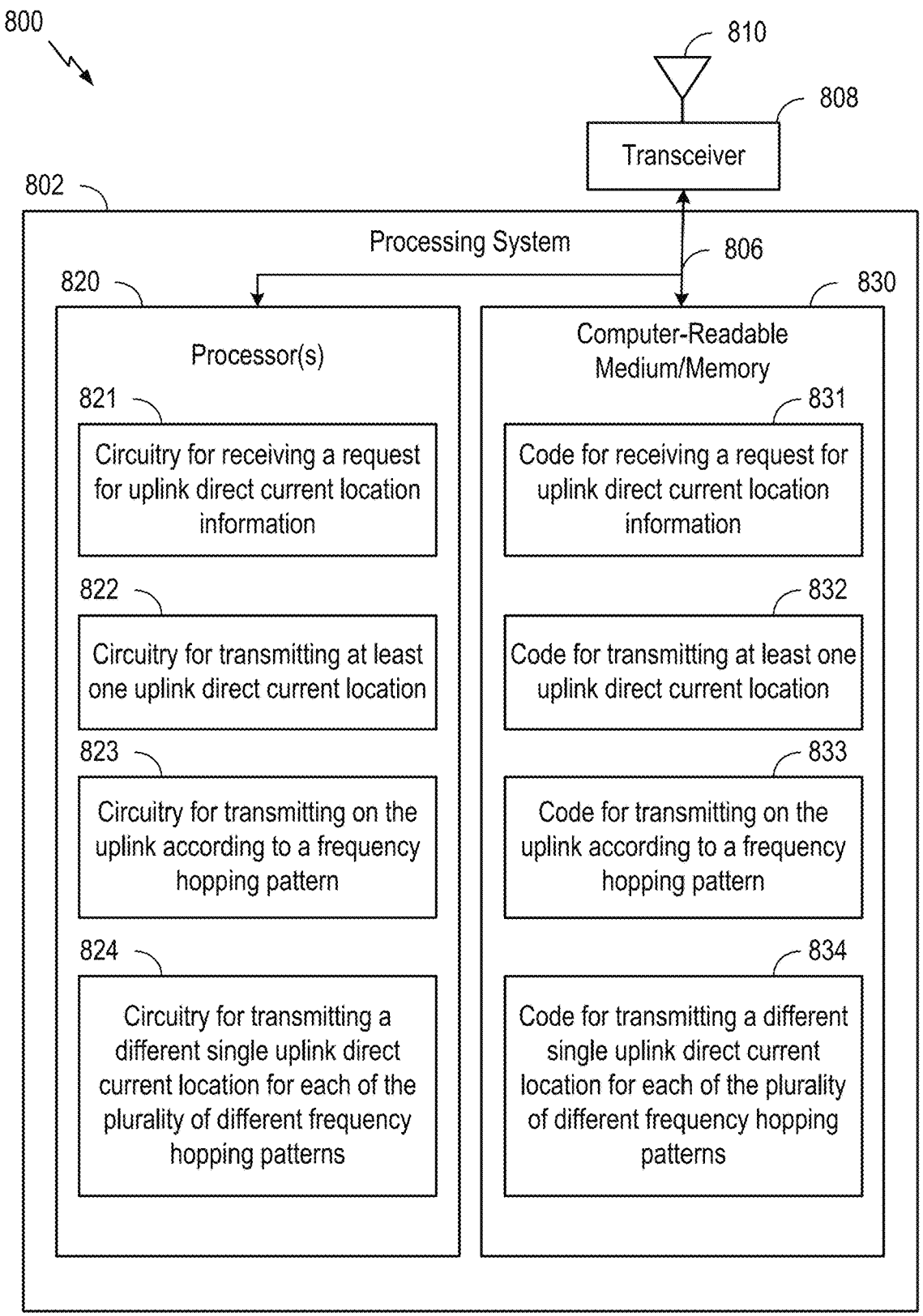
FIG. 8 is a block diagram illustrating aspects of an example communications device.

FIG. 8 is block diagram illustrating an example communications device 800 that includes various components operable, configured, or adapted to perform operations for the techniques disclosed herein, such as the operations illustrated and described with respect to FIGS. 5 and 6. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIGS. 5 and 6, or other operations for performing the various techniques discussed herein to provide the BS with a direct current location for one or more BWPs.

In the illustrated example, computer-readable medium/memory 830 stores code 831 for receiving, from a base station (BS), a request for uplink direct current location information of the UE, wherein the UE is configured to transmit to the BS on an uplink according to a frequency hopping pattern for hopping between a plurality of bandwidth parts corresponding to different frequency bandwidths; code 832 for transmitting, to the BS, at least one uplink direct current location applicable to the plurality of uplink bandwidth parts; code 833 for transmitting, to the BS, on the uplink according to the frequency hopping pattern code; and code 834 for transmitting, to the BS, a different single uplink direct current location for each of the plurality of different frequency hopping patterns.

In the illustrated example, the one or more processors 820 include circuitry configured to implement the code stored in the computer-readable medium/memory 830, including circuitry 821 for receiving, from a base station (BS), a request for uplink direct current location information of the UE, wherein the UE is configured to transmit to the BS on an uplink according to a frequency hopping pattern for hopping between a plurality of bandwidth parts corresponding to different frequency bandwidths; circuitry 822 for transmitting, to the BS, at least one uplink direct current location applicable to the plurality of uplink bandwidth parts; circuitry 823 for transmitting, to the BS, on the uplink according to the frequency hopping pattern code; and circuitry 824 for transmitting, to the BS, a different single uplink direct current location for each of the plurality of different frequency hopping patterns.

Various components of communications device 800 may provide means for performing the methods described herein, including with respect to FIGS. 5 and 6.

In some examples, means for transmitting or sending (or means for outputting for transmission) may include the transceivers 254 and/or antenna(s) 252 of the user equipment 104 illustrated in FIG. 2 and/or transceiver 808 and antenna 810 of the communication device 800 in FIG. 8.

In some examples, means for receiving (or means for obtaining) may include the transceivers 254 and/or antenna(s) 252 of the user equipment 104 illustrated in FIG. 2 and/or transceiver 808 and antenna 810 of the communication device 800 in FIG. 8.

In some examples, means for determining may include various processing system components, such as: the one or more processors 820 in FIG. 8, or aspects of the user equipment 104 illustrated in FIG. 2, including receive processor 258, transmit processor 264, TX MIMO processor 266, and/or controller/processor 280 (including BWP manager 198).

Notably, FIG. 8 is an example, and many other examples and configurations of communication device 800 are possible.

Figure 9:
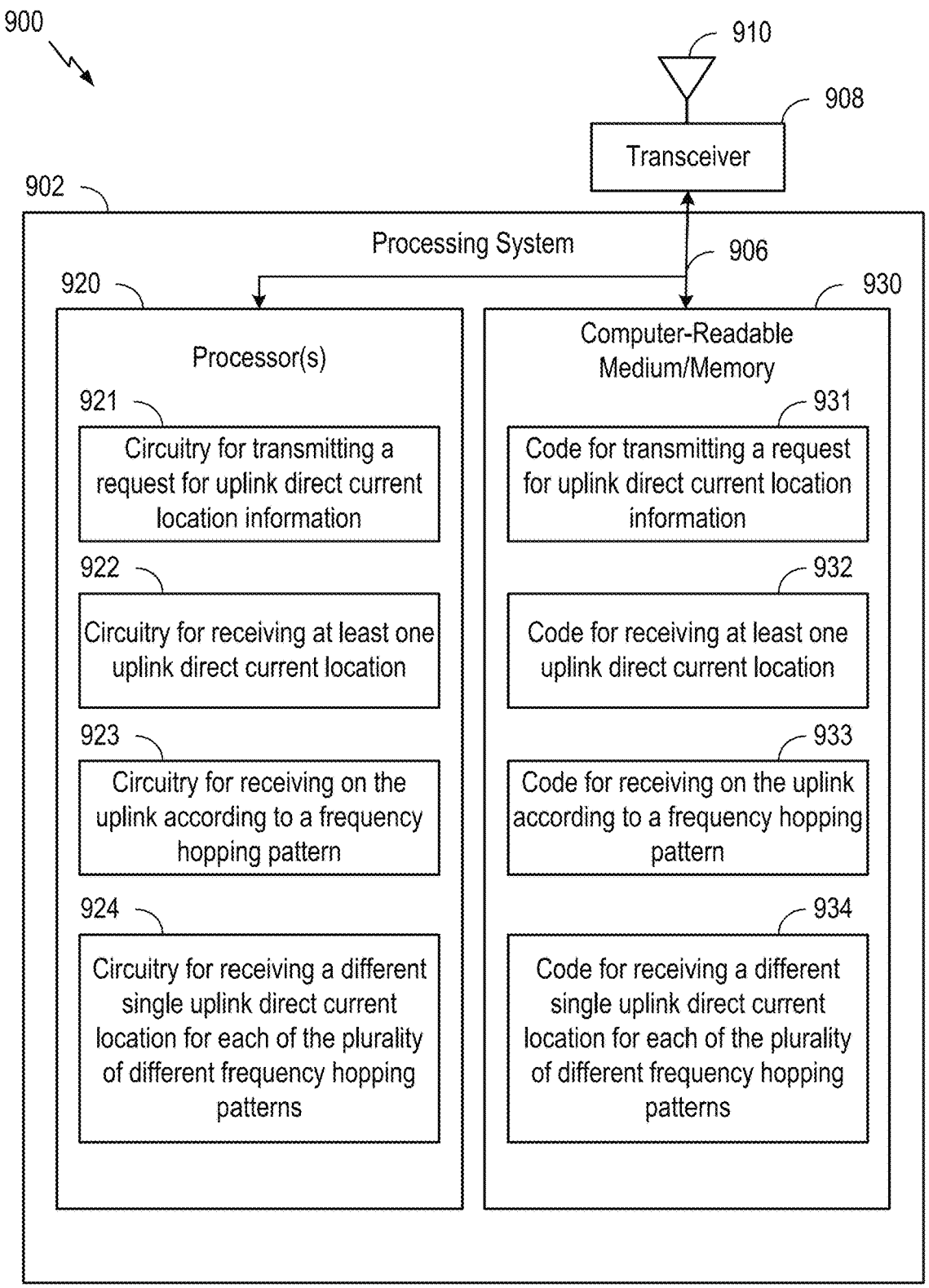
FIG. 9 is a block diagram illustrating aspects of an example communications device.

FIG. 9 is block diagram illustrating an example communications device 900 that includes various components operable, configured, or adapted to perform operations for the techniques disclosed herein, such as the operations illustrated and described with respect to FIGS. 5 and 7. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 5 and 7, or other operations for performing the various techniques discussed herein to request a direct current location for one or more BWPs.

In the illustrated example, computer-readable medium/memory 930 stores code 931 for transmitting, to a user equipment (UE), a request for uplink direct current location information of the UE, wherein the BS is configured to receive on the uplink from the UE according to a frequency hopping pattern for hopping between a plurality of bandwidth parts corresponding to different frequency bandwidths; code 932 for receiving, from the UE, at least one uplink direct current location applicable to the plurality of uplink bandwidth parts; code 933 for receiving, from the UE, on the uplink according to the frequency hopping pattern; code 934 for receiving, from the UE, a different single uplink direct current location for each of the plurality of different frequency hopping patterns.

In the illustrated example, the one or more processors 920 include circuitry configured to implement the code stored in the computer-readable medium/memory 930, including circuitry 921 for transmitting, to a user equipment (UE), a request for uplink direct current location information of the UE, wherein the BS is configured to receive on the uplink from the UE according to a frequency hopping pattern for hopping between a plurality of bandwidth parts corresponding to different frequency bandwidths; circuitry 922 for receiving, from the UE, at least one uplink direct current location applicable to the plurality of uplink bandwidth parts; circuitry 923 for receiving, from the UE, on the uplink according to the frequency hopping pattern; circuitry 924 for receiving, from the UE, a different single uplink direct current location for each of the plurality of different frequency hopping patterns.

Various components of communications device 900 may provide means for performing the methods described herein, including with respect to FIGS. 5 and 7.

In some examples, means for transmitting or sending (or means for outputting for transmission) may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communication device 900 in FIG. 9.

In some examples, means for determining may include various processing system components, such as: the one or more processors 920 in FIG. 9, or aspects of the base station 102 illustrated in FIG. 2, including receive processor 238, transmit processor 220, TX MIMO processor 230, and/or controller/processor 240 (including BWP manager 199).

Notably, FIG. 9 is an example, and many other examples and configurations of communication device 900 are possible.

Example Clauses

Implementation examples are described in the following numbered clauses:

Clause 1. A method for wireless communication by a user equipment (UE), comprising: receiving, from a base station (BS), a request for uplink direct current location information of the UE, wherein the UE is configured to transmit to the BS on an uplink according to a frequency hopping pattern for hopping between a plurality of uplink bandwidth parts corresponding to different frequency bandwidths; transmitting, to the BS, at least one uplink direct current location applicable to the plurality of uplink bandwidth parts; and transmitting, to the BS, on the uplink according to the frequency hopping pattern.

Clause 2. The method of Clause 1, wherein the at least one uplink direct current location comprises a single uplink direct current location applicable to the plurality of uplink bandwidth parts.

Clause 3. The method of Clause 2, wherein the single uplink direct current location is an actual uplink direct current location of one of the plurality of uplink bandwidth parts, and wherein the single uplink direct current location is a relative direct current location for each of the plurality of uplink bandwidth parts other than the one of the plurality of uplink bandwidth parts.

Clause 4. The method of Clause 3, wherein the frequency hopping pattern comprises a sequence of bandwidth parts, and wherein the one of the plurality of uplink bandwidth parts comprises a first bandwidth part in time of the sequence of bandwidth parts.

Clause 5. The method of Clause 2, wherein the single uplink direct current location is a relative direct current location for each of the plurality of uplink bandwidth parts.

Clause 6. The method of Clause 2, wherein the UE is configured with a plurality of different frequency hopping patterns, and wherein the single uplink direct current location is applicable to each of the plurality of different frequency hopping patterns.

Clause 7. The method of Clause 2, wherein the UE is configured with a plurality of different frequency hopping patterns, and further comprising transmitting, to the BS, a different single uplink direct current location for each of the plurality of different frequency hopping patterns.

Clause 8. The method of Clause 1, wherein the at least one uplink direct current location comprises a set of uplink direct current locations including a plurality of uplink direct current locations applicable to at least the plurality of uplink bandwidth parts.

Clause 9. The method of Clause 8, wherein the UE is configured with a plurality of different frequency hopping patterns, and the at least one uplink direct current location comprises a plurality of sets of uplink direct current locations each applicable to a different one of the plurality of different frequency hopping patterns.

Clause 10. The method of Clause 8, wherein the UE is configured with a plurality of different frequency hopping patterns, and wherein the plurality of uplink direct current locations comprise a union of actual uplink direct current locations of bandwidth parts used in the plurality of different frequency hopping patterns.

Clause 11. A method of wireless communication by a base station (BS), comprising: transmitting, to a user equipment (UE), a request for uplink direct current location information of the UE, wherein the BS is configured to receive on the uplink from the UE according to a frequency hopping pattern for hopping between a plurality of uplink bandwidth parts corresponding to different frequency bandwidths; receiving, from the UE, at least one uplink direct current location applicable to the plurality of uplink bandwidth parts; and receiving, from the UE, on the uplink according to the frequency hopping pattern.

Clause 12. The method of Clause 11, wherein the at least one uplink direct current location comprises a single uplink direct current location applicable to the plurality of uplink bandwidth parts.

Clause 13. The method of Clause 12, wherein the single uplink direct current location is an actual uplink direct current location of one of the plurality of uplink bandwidth parts, and wherein the single uplink direct current location is a relative direct current location for each of the plurality of uplink bandwidth parts other than the one of the plurality of uplink bandwidth parts.

Clause 14. The method of Clause 13, wherein the frequency hopping pattern comprises a sequence of bandwidth parts, and wherein the one of the plurality of uplink bandwidth parts comprises a first bandwidth part in time of the sequence of bandwidth parts.

Clause 15. The method of Clause 12, wherein the single uplink direct current location is a relative direct current location for each of the plurality of uplink bandwidth parts.

Clause 16. The method of Clause 12, wherein the single uplink direct current location is applicable to each of a plurality of different frequency hopping patterns.

Clause 17. The method of Clause 12, further comprising receiving, from the UE, a different single uplink direct current location for each of a plurality of different frequency hopping patterns.

Clause 18. The method of Clause 11, wherein the at least one uplink direct current location comprises a set of uplink direct current locations including a plurality of uplink direct current locations applicable to at least the plurality of uplink bandwidth parts.

Clause 19. The method of Clause 18, wherein the at least one uplink direct current location comprises a plurality of sets of uplink direct current locations each applicable to a different one of a plurality of different frequency hopping patterns.

Clause 20. The method of Clause 18, wherein the plurality of uplink direct current locations comprise a union of actual uplink direct current locations of bandwidth parts used in a plurality of different frequency hopping patterns.

Clause 21: A processing system, comprising: a memory and a processor configured to perform a method in accordance with any one of Clauses 1-20.

Clause 22: A processing system, comprising means for performing a method in accordance with any one of Clauses 1-20.

Clause 23: A non-transitory computer-readable medium comprising computer-executable instructions that, when executed by one or more processors of a processing system, cause the processing system to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are illustrated, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency-domain with OFDM and in the time-domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Additional Considerations

The preceding description provides examples techniques for providing direct current locations of bandwidth parts (BWPs) in a BWP hopping pattern used in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
a memory comprising instructions; and
one or more processors configured to execute the instructions and cause the UE to:
receive, from a base station (BS), a request for uplink direct current location information of the UE, wherein the UE is configured to transmit to the BS on an uplink over a plurality of uplink bandwidth parts corresponding to different frequency bandwidths by hopping between the plurality of uplink bandwidth parts according to a frequency hopping pattern;
transmit, to the BS, an indication of at least one uplink direct current location applicable to the plurality of uplink bandwidth parts, wherein the at least one uplink direct current location comprises a first uplink direct current location for one uplink bandwidth part of the plurality of uplink bandwidth parts and the first uplink direct current location for the one uplink bandwidth part corresponds to a relative uplink direct current location for each of other uplink bandwidth parts in the plurality of uplink bandwidth parts, and wherein a relative frequency location corresponding to the relative uplink direct current location within the each of the other uplink bandwidth parts is the same as a first frequency location corresponding to the first uplink direct current location within the one uplink bandwidth part; and
transmit, to the BS, on the uplink according to the frequency hopping pattern.

2. The UE of claim 1, wherein the at least one uplink direct current location comprises a single uplink direct current location applicable to the plurality of uplink bandwidth parts.

3. The UE of claim 2, wherein the single uplink direct current location is an actual uplink direct current location of one of the plurality of uplink bandwidth parts, and wherein the single uplink direct current location is a relative direct current location for each of the plurality of uplink bandwidth parts other than the one of the plurality of uplink bandwidth parts.

4. The UE of claim 3, wherein the frequency hopping pattern comprises a sequence of bandwidth parts, and wherein the one of the plurality of uplink bandwidth parts comprises a first bandwidth part in time of the sequence of bandwidth parts.

5. The UE of claim 2, wherein the single uplink direct current location is a relative direct current location for each of the plurality of uplink bandwidth parts.

6. The UE of claim 2, wherein the UE is configured with a plurality of different frequency hopping patterns, and wherein the single uplink direct current location is applicable to each of the plurality of different frequency hopping patterns.

7. The UE of claim 2, wherein the UE is configured with a plurality of different frequency hopping patterns, and wherein the one or more processors are configured to cause the UE to transmit, to the BS, a different single uplink direct current location for each of the plurality of different frequency hopping patterns.

8. The UE of claim 1, wherein the at least one uplink direct current location comprises a set of uplink direct current locations including a plurality of uplink direct current locations applicable to at least the plurality of uplink bandwidth parts.

9. The UE of claim 8, wherein the UE is configured with a plurality of different frequency hopping patterns, and the at least one uplink direct current location comprises a plurality of sets of uplink direct current locations each applicable to a different one of the plurality of different frequency hopping patterns.

10. The UE of claim 8, wherein the UE is configured with a plurality of different frequency hopping patterns, and wherein the plurality of uplink direct current locations comprise a union of actual uplink direct current locations of bandwidth parts used in the plurality of different frequency hopping patterns.

11. A base station (BS), comprising:
a memory comprising instructions; and
one or more processors configured to execute the instructions and cause the BS to:
transmit, to a user equipment (UE), a request for uplink direct current location information of the UE, wherein the BS is configured to receive on an uplink from the UE over a plurality of uplink bandwidth parts corresponding to different frequency bandwidths according to a frequency hopping pattern for hopping between the plurality of uplink bandwidth parts;
receive, from the UE, an indication of at least one uplink direct current location applicable to the plurality of uplink bandwidth parts, wherein the at least one uplink direct current location comprises a first uplink direct current location for one uplink bandwidth part of the plurality of uplink bandwidth parts and the first uplink direct current location for the one uplink bandwidth part corresponds to a relative uplink direct current location for each of other uplink bandwidth parts in the plurality of uplink bandwidth parts, and wherein a relative frequency location corresponding to the relative uplink direct current location within the each of the other uplink bandwidth parts is the same as a first frequency location corresponding to the first uplink direct current location within the one uplink bandwidth part; and
receive, from the UE, on the uplink according to the frequency hopping pattern.

12. The BS of claim 11, wherein the at least one uplink direct current location comprises a single uplink direct current location applicable to the plurality of uplink bandwidth parts.

13. The BS of claim 12, wherein the single uplink direct current location is an actual uplink direct current location of one of the plurality of uplink bandwidth parts, and wherein the single uplink direct current location is a relative direct current location for each of the plurality of uplink bandwidth parts other than the one of the plurality of uplink bandwidth parts.

14. The BS of claim 13, wherein the frequency hopping pattern comprises a sequence of bandwidth parts, and wherein the one of the plurality of uplink bandwidth parts comprises a first bandwidth part in time of the sequence of bandwidth parts.

15. The BS of claim 12, wherein the single uplink direct current location is a relative direct current location for each of the plurality of uplink bandwidth parts.

16. The BS of claim 12, wherein the single uplink direct current location is applicable to each of a plurality of different frequency hopping patterns.

17. The BS of claim 12, wherein the one or more processors are configured to execute the instructions and cause the BS to:

receive, from the UE, a different single uplink direct current location for each of a plurality of different frequency hopping patterns.

18. The BS of claim 11, wherein the at least one uplink direct current location comprises a set of uplink direct current locations including a plurality of uplink direct current locations applicable to at least the plurality of uplink bandwidth parts.

19. The BS of claim 18, wherein the at least one uplink direct current location comprises a plurality of sets of uplink direct current locations each applicable to a different one of a plurality of different frequency hopping patterns.

20. The BS of claim 18, wherein the plurality of uplink direct current locations comprise a union of actual uplink direct current locations of bandwidth parts used in a plurality of different frequency hopping patterns.

21. A method for wireless communication by a user equipment (UE), comprising:

receiving, from a base station (BS), a request for uplink direct current location information of the UE, wherein the UE is configured to transmit to the BS on an uplink over a plurality of uplink bandwidth parts corresponding to different frequency bandwidths by hopping between the plurality of uplink bandwidth parts according to a frequency hopping pattern;

transmitting, to the BS, an indication of at least one uplink direct current location applicable to the plurality of uplink bandwidth parts, wherein the at least one uplink direct current location comprises a first uplink direct current location for one uplink bandwidth part of the plurality of uplink bandwidth parts and the first uplink direct current location for the one uplink bandwidth part corresponds to a relative uplink direct current location for each of other uplink bandwidth parts in the plurality of uplink bandwidth parts, and wherein a relative frequency location corresponding to the relative uplink direct current location within the each of the other uplink bandwidth parts is the same as a first frequency location corresponding to the first uplink direct current location within the one uplink bandwidth part; and transmitting, to the BS, on the uplink according to the frequency hopping pattern.

22. A method of wireless communication by a base station (BS), comprising:

transmitting, to a user equipment (UE), a request for uplink direct current location information of the UE, wherein the BS is configured to receive on an uplink from the UE over a plurality of uplink bandwidth parts corresponding to different frequency bandwidths according to a frequency hopping pattern for hopping between the plurality of uplink bandwidth parts;

receiving, from the UE, an indication of at least one uplink direct current location applicable to the plurality of uplink bandwidth parts, wherein the at least one uplink direct current location comprises a first uplink direct current location for one uplink bandwidth part of the plurality of uplink bandwidth parts and the first uplink direct current location for the one uplink bandwidth part corresponds to a relative uplink direct current location for each of other uplink bandwidth parts in the plurality of uplink bandwidth parts, and wherein a relative frequency location corresponding to the relative uplink direct current location within the each of the other uplink bandwidth parts is the same as a first frequency location corresponding to the first uplink direct current location within the one uplink bandwidth part; and receiving, from the UE, on the uplink according to the frequency hopping pattern.

* * * * *